United States Patent [19]
Wang et al.

[11] Patent Number: 5,926,393
[45] Date of Patent: Jul. 20, 1999

[54] METHOD FOR DESIGNING A PROFILE EXTRUSION DIE PLATE FOR SHAPING A POLYMER RESIN INTO A PROFILE

[75] Inventors: Hsin-Pang Wang, Rexford, N.Y.; Erich Otto Teutsch, Richmond, Mass.; Martin Kin-Fei Lee, Schenectady, N.Y.; Erin Marie Perry, Niskayuna, N.Y.; Rick Francis Fiumara, Waterford, N.Y.; Srikanth Nanguneri, Clifton Park, N.Y.

[73] Assignee: General Electric Company, Schenectady, N.Y.

[21] Appl. No.: 08/729,997

[22] Filed: Oct. 11, 1996

[51] Int. Cl.⁶ .................................................. G06F 17/00
[52] U.S. Cl. .................... 364/488; 364/468.03; 364/578; 364/512
[58] Field of Search ..................... 364/488–491, 364/468.03, 468, 475.01, 512, 578; 264/40.1, 40.7; 425/140, 149, 461

[56] References Cited

U.S. PATENT DOCUMENTS

| | | | |
|---|---|---|---|
| 3,927,160 | 12/1975 | Medley | 264/45.5 |
| 4,190,692 | 2/1980 | Larsen | 428/107 |
| 4,541,981 | 9/1985 | Lowery et al. | 264/209.1 |
| 4,828,770 | 5/1989 | Fabian et al. | 264/40.3 |
| 5,007,818 | 4/1991 | Barancik et al. | 425/144 |
| 5,069,612 | 12/1991 | Teutsch et al. | 425/133.1 |
| 5,089,200 | 2/1992 | Chapman, Jr. et al. | 264/127 |
| 5,108,526 | 4/1992 | Cornils et al. | 156/108 |
| 5,204,035 | 4/1993 | Boltze et al. | 264/146 |
| 5,393,216 | 2/1995 | Teutsch et al. | 425/133.1 |
| 5,482,667 | 1/1996 | Dunton et al. | 264/136 |
| 5,499,441 | 3/1996 | Dunton et al. | 29/527.2 |
| 5,608,637 | 3/1997 | Wang et al. | 364/468.03 |
| 5,660,922 | 8/1997 | Herridge et al. | 428/214 |

FOREIGN PATENT DOCUMENTS 0748681  5/1996  European Pat. Off. ........ B29C 47/12

OTHER PUBLICATIONS

"Plastics Extrusion Operating Manual" By Allan L. Griff, 10th Revised Edition, 1992.

"Cyclac" ABS Resin Design Guide, GE Plastics, May 1990.

"Die Design Principles for Extrusiuon of Polymers" by Leonard Sansone, Society of Plastics Engineers Educational Seminars, Sussex Plastics Engineering, Andover, NJ, Jun. 1994.

"Computer Program Slashes Die Design Times" by Bernie Miller, PlasticsWorld, No. 10, Oct. 1995, pp. 12–13.

"A New Design Procedure for Profile Extrusion Dies" Polymer Engineering & Science, vol. 36, No. 5, Mar. 1996, pp. 626–635.

"Computer–Aided Design of Extrusion Dies" by Mingua Jia, et al, Computers and Graphics, vol. 12, No. 3/4, Jan. 1988, pp. 335–340.

"Computer–Aided Mold and Die Design" by J. Hess, et al, Industrial & Production Engineering (PE International), vol. 12, No. 2, 1988, pp. 78, 80–81.

"Extrusion Dies" by Walter Michaeli, Hanser Publishers, 1984, pp. 5, 8, 70 & 72.

*Primary Examiner*—Kevin J. Teska
*Assistant Examiner*—Vuthe Siek
*Attorney, Agent, or Firm*—David C. Goldman; Jill M. Breedlove

[57] ABSTRACT

The present invention discloses a method for designing a profile extrusion die for shaping a polymer resin material into a profile having a plurality of sections. In the present invention, a plurality of operating conditions for shaping the resin material into the profile are determined. The dimensions of each of the plurality of sections of the profile are then specified. The profile dimensions include width and thickness. Extrusion information for the polymer resin including die swell/drawdown and flow balance is obtained. Die dimensions for shaping the profile in accordance with the operating conditions, the profile dimensions, and the extrusion information are then determined.

9 Claims, 8 Drawing Sheets

| Advan | Basic | Recall | Exit | Help |

Input the following set points

| 5 | Number of sections (1-50) |

| 10 | Draw Speed (ft/min) |

| 1.5 | Die Land Length (inches) |

| 2500 | Pressure drop across die plate (psi) |

*FIG. 6*

| | Start | Exit | Back | Help | |
|---|---|---|---|---|---|

PROFILE

| | WIDTH | THICK |
|---|---|---|
| Input Values For Section #1 | 0.109 | 0.064 |
| Input Values For Section #2 | 0.227 | 0.064 |
| Input Values For Section #3 | 0.301 | 0.060 |
| Input Values For Section #4 | 0.431 | 0.050 |
| Input Values For Section #5 | 0.301 | 0.060 |

*FIG. 7*

METHOD FOR DESIGNING A PROFILE EXTRUSION DIE PLATE FOR SHAPING A POLYMER RESIN INTO A PROFILE

BACKGROUND OF THE INVENTION

The present invention relates generally to a profile extrusion die and more particularly to a method for designing a profile extrusion die plate for shaping a polymer resin into a profile.

Typically, a profile extrusion die is designed by using experimental iterations of experienced-based rules developed by designers resulting in many cutting trials. In particular, the designers use rules that have been developed through their experiences to derive a die design. The derived die design is then implemented in an extrusion process and evaluated to determine if the die land length, die opening thickness, and die opening width produce the desired dimensions of the profile. If the dimensions are not met then the die must be re-cut so that the desired dimensions can be met. Usually there are many iterations of cutting and then changing the die before a die design is derived that yields the desired profile dimensions. This design methodology requires a lot of work and time and a tremendous amount of experience-based data. In addition, every time the dimensions are changed or a new plastic resin is used in the extrusion process, then the die must be modified, which involves more time, work, and money. As a result, designers are very reluctant to work with new plastic resins, which hinders the introduction of these resins into the profile extrusion market. Therefore, there is a need for a procedure that enables a designer to readily design a die for shaping products having varying dimensions and for shaping products made from varying types of resins.

SUMMARY OF THE INVENTION

Accordingly, it is a primary objective of the present invention to provide a method that enables designers to readily design a die for shaping products having varying dimensions and for shaping products made from varying types of resins.

Another object of the present invention is to provide a methodology for designing a profile extrusion die that reduces work, costs, and total cycle time from tooling design to the market place.

Still another object of the present invention is to a provide a physics-based method that uses die swell/drawdown and flow balance information to design a profile extrusion die.

Thus, in accordance with the present invention, there is provided a method for designing an extrusion die for shaping a polymer resin material into a profile having a plurality of sections. In the present invention, a plurality of operating conditions for shaping the resin material into the profile are determined. The dimensions of each of the plurality of sections of the profile are specified. The profile dimensions include width and thickness. Extrusion information for the polymer resin including die swell/drawdown and flow balance is obtained. Die dimensions for shaping the profile in accordance with the operating conditions, the profile dimensions, and the extrusion information are then determined.

While the present invention will hereinafter be described in connection with an illustrative embodiment and method of use, it will be understood that it is not intended to limit the invention to this embodiment. Instead, it is intended to cover all alternatives, modifications and equivalents as may be included within the spirit and scope of the present invention as defined by the appended claims.

BRIEF DESCRIPTION OF THE DRAWINGS

FIG. 6 is an example of a screen view from a personal computer (PC) requesting that various operating information be inputted;

FIG. 7 shows an example of another screen view from a PC requesting that the width and thickness of each section of the profile be inputted.

DETAILED DESCRIPTION OF THE PRESENT INVENTION

The present invention provides a computer-implemented methodology for designing an extrusion die plate that shapes a polymer resin material into a profile having a plurality of sections. The methodology uses a synthesis approach rather than a traditional analysis approach. An analysis approach predicts the performance based on the design. On the other hand, a synthesis approach predicts the design based on the performance or the design goal. Typically, the development of synthesis tools is much more complicated than developing analysis tools. Using profile extrusion as an example, the analysis approach would predict the final profile dimensions based on the die dimensions. An example of an analysis approach used to predict the final profile dimensions based on the die dimensions is disclosed in U.S. Pat. No. 5,608,637, which is incorporated herein by reference. In that invention, the designer conducts parametric studies by varying many different design alternatives in order to achieve optimum performance. In the synthesis approach disclosed in the present invention, the die dimensions are predicted based on the desired profile dimensions, which are measures of the die's performance.

In order to predict the die dimensions based on the desired profile dimensions, the present invention has identified the complex relationships between the die design dimensions and the desired profile dimensions by linking together the flow/force balance inside the die with the die swell or drawdown (hereinafter die swell/drawdown) that occurs at the die exit, which is based on the mass balance at the downstream. Die swell will occur if the velocity of the resin at the die exit exceeds the puller speed. Drawdown (or reduction in the cross-section of the profile) will occur if the puller speed exceeds the resin velocity at the die exit.

Figure 1:
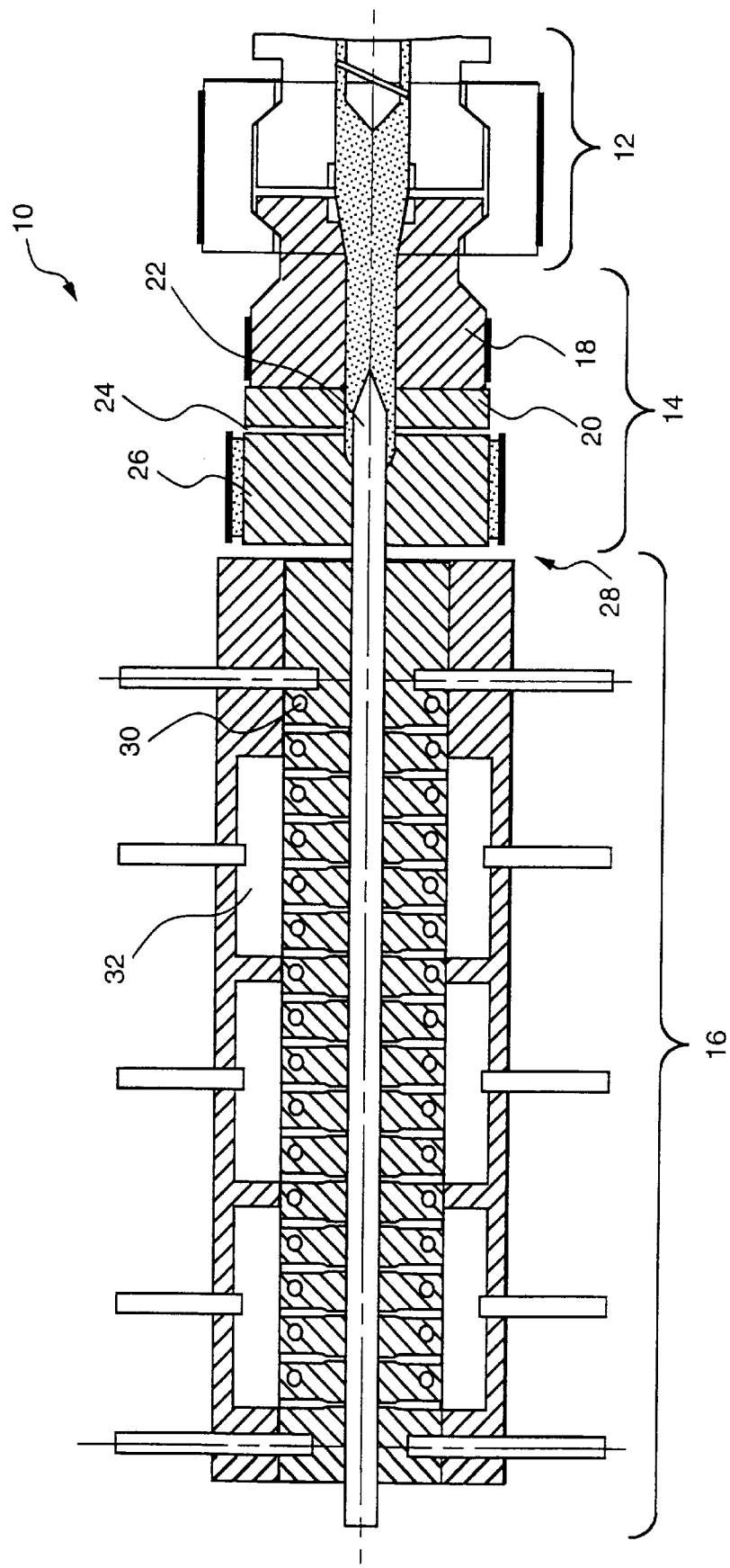
FIG. 1 is a schematic diagram of a profile extruder.

A better understanding of these terms will be appreciated in view of FIG. 1, which shows a schematic diagram of a profile extruder 10 used for processing a polymer resin. The profile extrusion process includes three major components, namely the extruder 12, the die 14, and the calibrator 16. The extruder 12 receives the resin, mixes it and melts the resin into a miscible blend, and pumps flame retardant into the blend. The die 14 includes a die body 18 which provides the basic profile shape of the product as the resin blend flows through it. A spider plate 20 connected to the die body 18 holds a mandrel 22 located in the die 14. A pre-land 24 provides additional shaping to the resin blend and a die plate 26 (i.e., face plate or land) provides the final shaping to the blend. This die plate 26 can consist of one or more plates, each of which provides some shaping of the resin. The design of the die plate 26 is described below in further detail. The shaped resin leaves the die plate and passes through a gap 28 which lets the resin expand or contract, depending on the relative velocity of the resin at the die exit and the puller. After passing through the gap 28, the shaped product enters the calibrator 16 which cools the shaped resin and fine tunes the final dimensions of the product. In particular, the resin is cooled by cooling water running through water lines 30 while the dimensions are fine tuned by vacuums 32. A puller, not shown, then draws the product from the calibrator. A more detailed description of a profile extrusion process is disclosed in A. Griff, PLASTICS EXTRUSION OPERATING MANUAL, AN INTRODUCTION AND GUIDE TO EXTRUSION, 1–58 (1992), which is incorporated herein by reference.

As mentioned above, the design of the profile extrusion die plate depends on the die swell/drawdown and flow balance of the material used in the extrusion process. In the illustrative embodiment, the material is a polymer resin that exhibits viscoelastic properties such as linear and branched polymers of polycarbonates, polyesters, polyphenylene ethers, polyimides, olefins, polyetherimides, polyamides, polyarylene sulfides, polysulfones, polyetherketones, acrylonitrile butadiene styrene copolymers, polystyrenes and blends, and compositions or copolymers prepared therefrom. In addition, materials made from glass or wood filled polymers are within the scope of the present invention. These materials exhibiting viscoelastic properties will naturally experience die swell which is the expansion of the material after it has been shaped by the die plate. The die swell is due to two effects, the Deborah or memory effect and the Weissenburg or flow rate effect. The memory effect occurs when the viscoelastic material flows from the large cross section of the die body 18, through the spider plate 20, and through the very thin cross section of the pre-land 24 and die plate 26. As the polymer molecules line up in the entrance region of the die plate 26, the molecules try to return to their random state as they move from the die 14. The memory effect is usually overcome by keeping the resin in the length of the die plate 26 (which is known as the die land length) for a longer residence time so that the material eventually loses its memory of its more random state. The flow rate effect occurs when the viscoelastic material flows very quickly through the die 14, causing the material to shear. Typically, the shear will be greater for viscoelastic material having a thinner thickness and a higher extrusion rate and lower for materials having a thicker thickness and a lower extrusion rate. The Weissenburg effect means that higher shear results in higher die swell. However, this natural die swell can be reduced or eliminated if the puller speed exceeds the resin velocity at the die exit, which leads to the drawdown condition.

Figure 2:
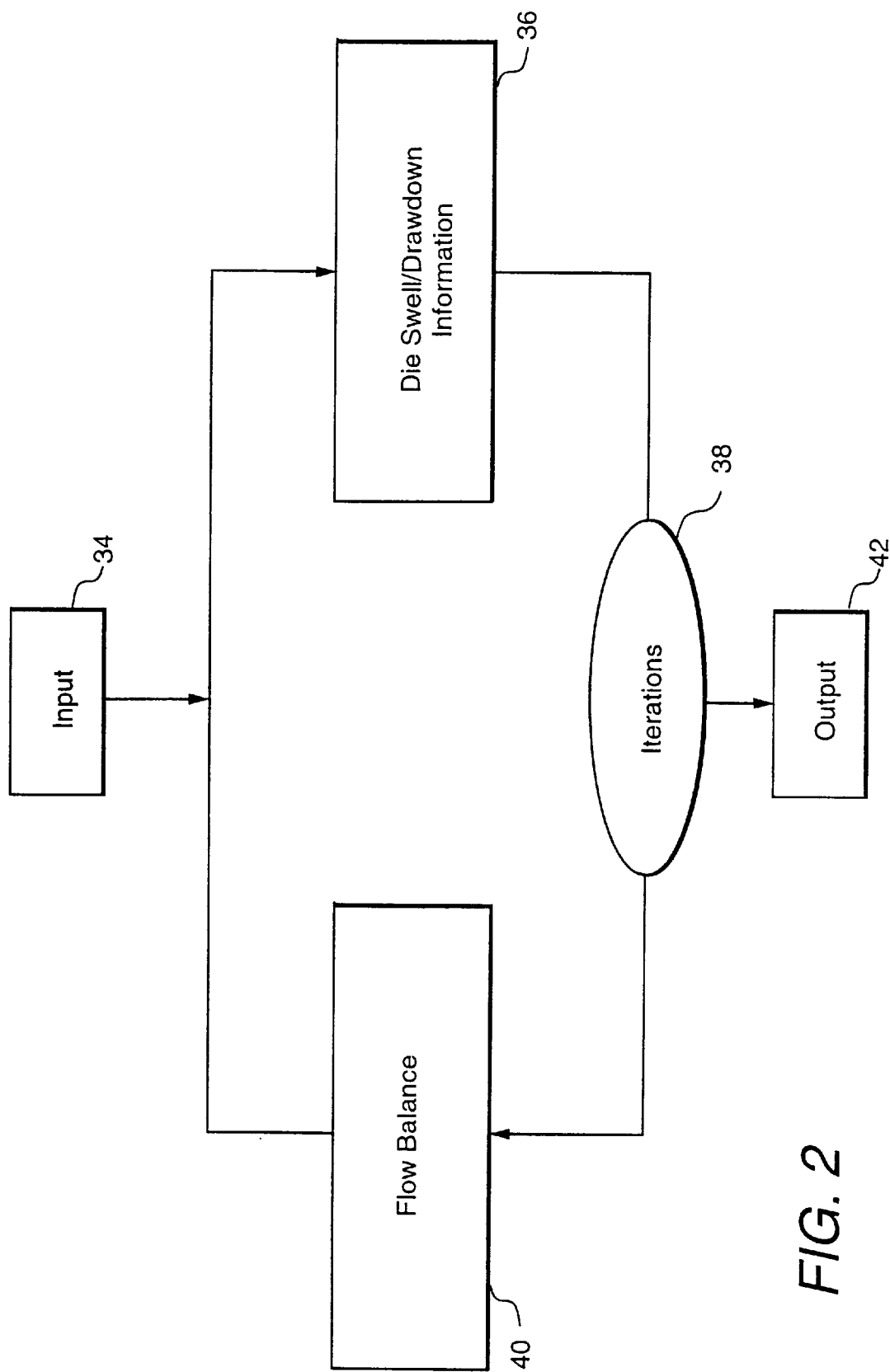
FIG. 2 is a flow chart describing the profile die design synthesis of the present invention.

In the present invention, die swell/drawdown information and flow balance are fully integrated and solved simultaneously to assure success of the die design. A flow chart describing the profile die design synthesis is shown in FIG. 2. In the flow chart, input for shaping the profile product is entered into a computer such as a PC at 34. The input includes a plurality of operating conditions such as draw speed, E, die land length, $L_{die}$, and pressure drop across the die plate, $\Delta P$. In addition, other information is inputted into the computer such as the dimensions of the geometry of the profile. In particular, the width and thickness of each section of the profile is entered into the computer. The information inputted at 34 is then used with the die swell/drawdown information at 36 which includes mass balance information to determine the die plate widths and thicknesses. Iterations are made at 38 and additional flow balance information at 40 is used with the die swell/drawdown information to obtain new die plate values that are satisfactory. Once a satisfactory result, i.e., the die dimensions, has been attained, the result is output to the designer at 42. The output information is then used to design a die plate that will shape a polymer resin material into a profile having a desired geometry.

The present invention is able to perform the synthesis of designing the die plate from the desired profile dimensions by linking together the flow/force balance inside the die plate with the die swell/drawdown at the die plate exit. Because of the die swell/drawdown at the die plate exit, the resin velocity changes from the die plate region to the die exit to the downstream area. A well-balanced flow means that the resin velocities for all sections of the profile at the downstream should be constant.

Computer modeling enables a person of ordinary skill in the art to develop a fundamental understanding of die swell/drawdown for a viscoelastic material in a profile extrusion process. In the present invention, an off-the-shelf viscoelastic computer software package is used to develop a parametric relationship for the effects that flow rate and the ratio of die land length to die opening thickness have on the die swell/drawdown behavior of the resin. In the present invention, the viscoelastic model is based on the differential Phan-Tien Tanner model, which is well known to skilled artisans. In particular, the model uses material properties such as viscosity, relaxation time, storage modulus, loss modulus, first and second normal stress differences, and extensional viscosity as parameters to find a range of shear rates for corresponding die swell/drawdown and ratios of die land length to die opening thickness for actual extrusion process conditions. In a one-dimensional approach it is assumed that both the cross flows and the edge effects are of secondary importance and also the calculated velocity is an average value in both the thickness and width directions, considering the aspect ratio of the die width to the die thickness. Within a typical processing range of the shear rate, usually between 50 to 500 s$^{-1}$, the viscosity curve can be approximated by the Power law, which is defined as:

$$\eta = K\gamma^{n-1}, \text{ wherein} \quad (1)$$

$\eta$ is the viscosity, $\gamma$ is the shear rate, K is the consistency index and n is the power index. The average velocity through the die thickness using the one-dimensional flow balance equation between two flat plates is defined as:

$$V_{die} = \frac{nt_{die}}{2(2n+1)} \left( \frac{t_{die} \Delta P}{2L_{die} K} \right)^{1/n}, \text{ wherein} \quad (2)$$

$t_{die}$ is the die thickness, $\Delta P$ is the pressure drop across the die plate, and $L_{die}$ is the die land length. Since most of the pressure loss occurs within the die plate, a constant die pressure boundary condition at the die body region (i.e. a reservoir before material enters the flow restrictor of the die plate) is applied.

The die swell/drawdown information in the flow chart of FIG. 2 is obtained from die swell/drawdown design charts that are stored in memory in a PC. One die swell/drawdown design chart is used for designing the die opening thickness and the other chart is for designing the die opening width. The die swell/drawdown design charts are obtained by modeling the relationship between the die swell and ratio of profile thickness to die opening thickness for a particular polymer resin. The profile thickness to die opening thickness ratios that correspond to the reduced die swell/drawdowns and shear effects are used as values for the design of the die plate. In addition to the modeling of the die swell/drawdown, the ratio of the profile thickness to die opening thickness, and the corresponding shear rates, experimental data of the flow rate effect on die swell/drawdown for experimental dies in an extrusion process is studied on-line using an instrumentation and data acquisition system. A more detailed discussion on the modeling of die swell/drawdown information and obtaining experimental data for an extrusion die is provided in U.S. Pat. No. 5,608,637, which is incorporated herein by reference. The experimental data and the modeled representation obtained from the instrumentation and data acquisition system are then arranged into the die design charts.

Figure 3:
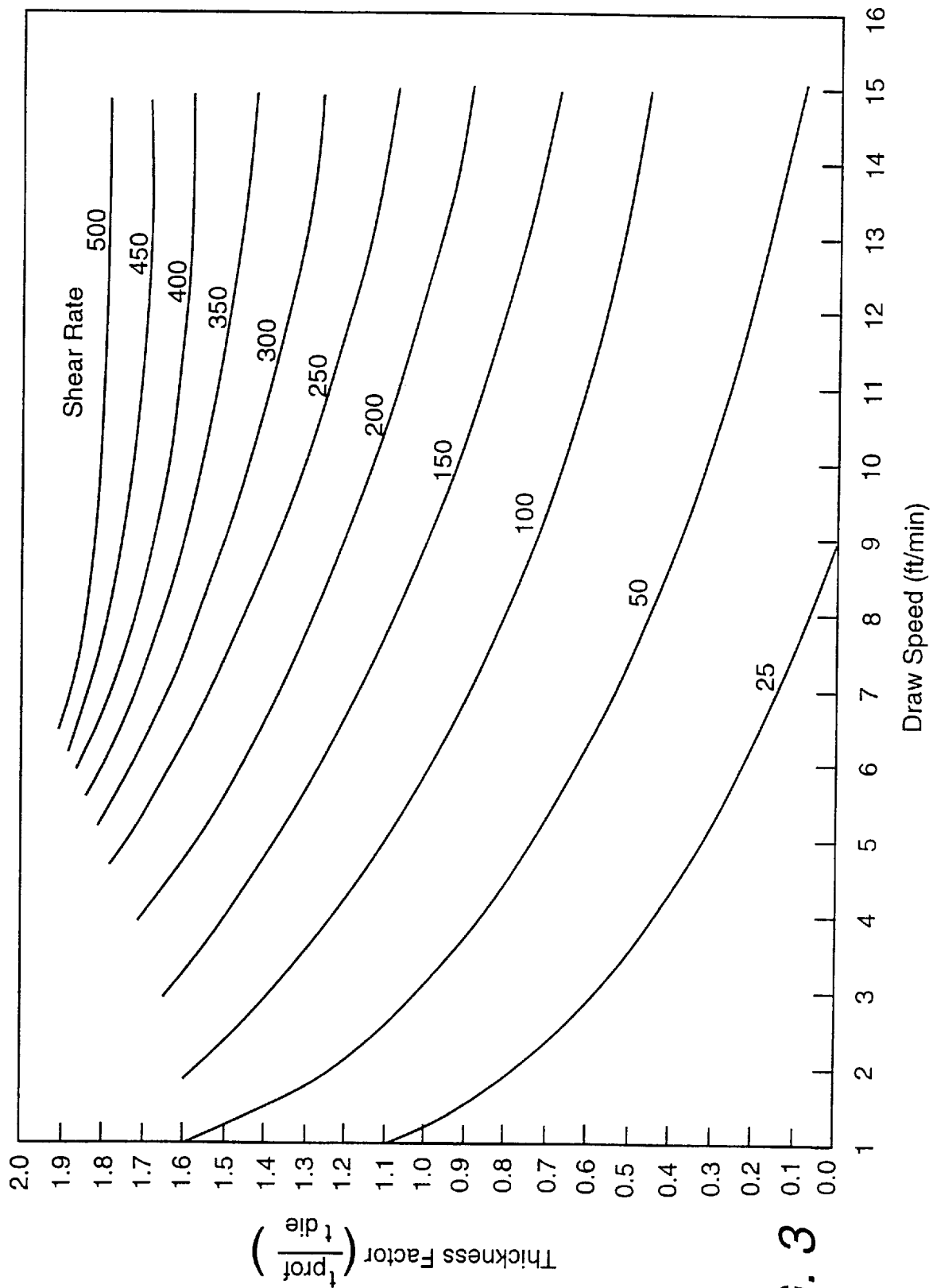
FIG. 3 is a design chart used for designing die opening thickness.
Figure 4:
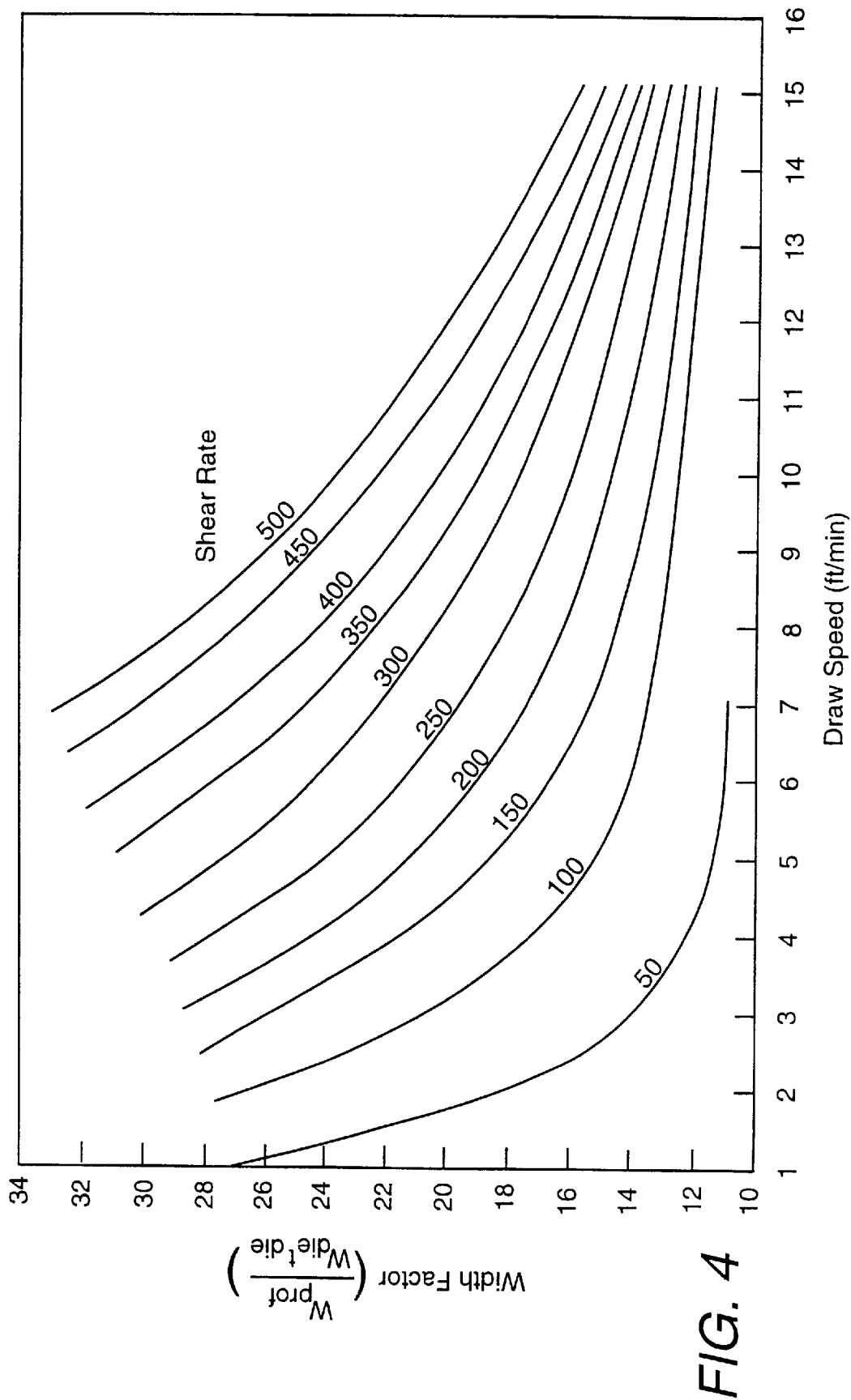
FIG. 4 is a design chart used for designing die opening width.

Two die swell/drawdown design charts are shown in FIGS. 3 and 4. FIG. 3 shows a design chart used for designing the die opening thickness and FIG. 4 shows a design chart used for designing the die opening width. The design charts in FIGS. 3 and 4 contain a plurality of curves showing the thickness and width factors at different draw speeds and shear rates. As shown in FIG. 3, the constant shear rate lines are not uniformly distributed because of the non-linear relationship between the die swell/drawdown and the shear rate. FIG. 3 also shows that all of the lines converge to a point in the upper left corner. On the other hand, the constant shear rate lines in the width design chart of FIG. 4 converge to a point on the lower right corner. This is due to the mass balance.

Usually in a profile die there are many sections having different thicknesses. FIGS. 3 and 4 indicate that different wall thicknesses will have different shear rates and subsequently different die swell/drawdown under one draw speed. From both the die swell/drawdown and the flow balance points of view, it is preferred that all wall sections be as uniform in thickness as possible. However, this is very difficult to follow in practice, especially for profiles with hollow sections. The interior sections which usually have no direct contact with the calibrator surface require thinner thicknesses for the reasons of less heat release and higher throughput.

Figure 5:
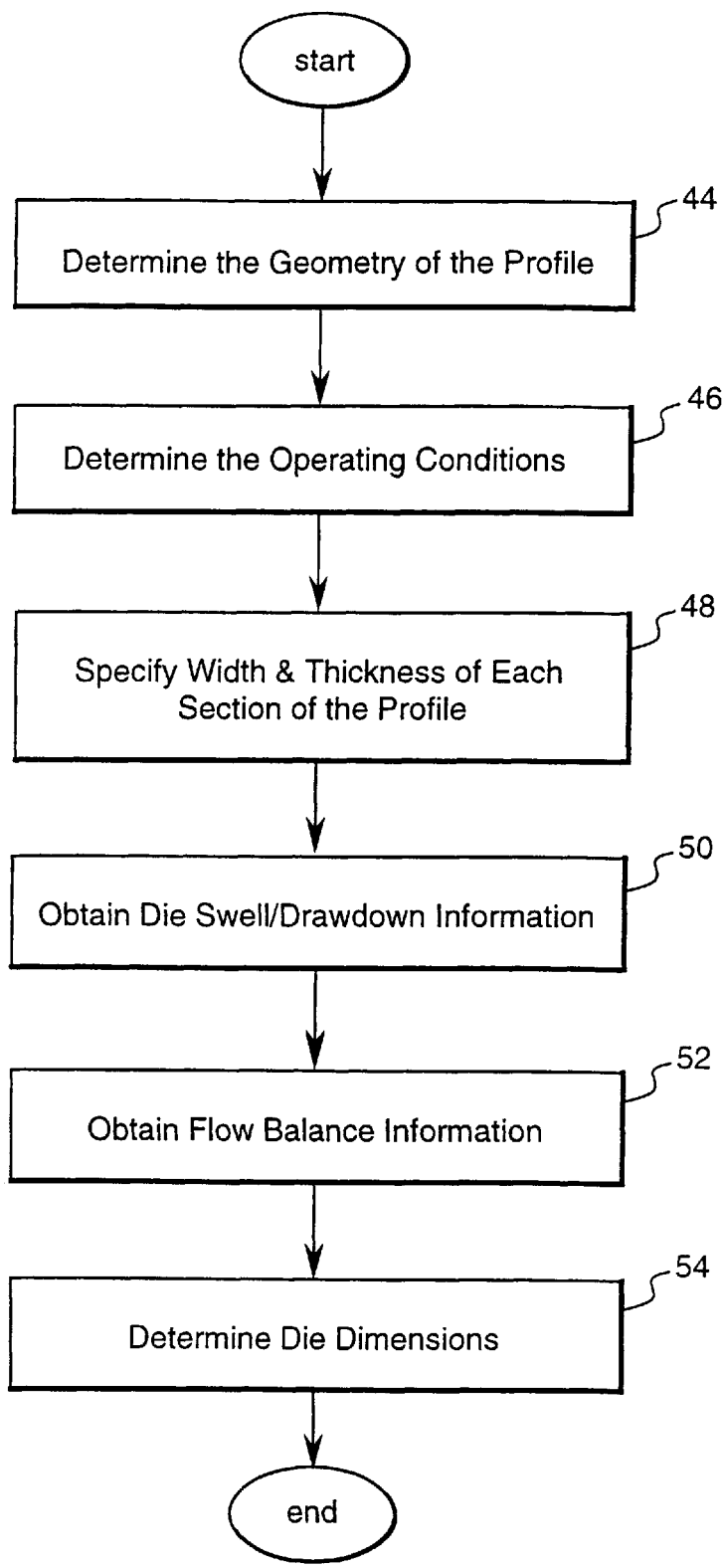
FIG. 5 is a flow chart illustrating the operation of designing a profile die according to the present invention.

The die design charts are then used to determine the dimensions for a profile extrusion die that will shape a polymer resin material into a profile of a product having a desired geometry. FIG. 5 sets forth a flow chart illustrating the operation of applying the flow balance information and the die swell/drawdown information in the design charts to determine the dimensions of the die. This operation is stored in the PC's memory or can be written on a floppy disk, compact disc, or other computer readable medium as computer readable program code means embodied therein and used with a computer to determine the dimensions of an extrusion die. At 44, the operation begins by determining the geometry of the desired profile. The profile includes the number of sections in the profile. Next, the operating conditions are determined at 46. The operating conditions include draw speed, E, die land length, $L_{die}$, and pressure drop across the die plate, $\Delta P$. At 48, the width and thickness of each section of the profile are specified. At 50, the die swell/drawdown information for the polymer resin that is to be used in the extrusion process is obtained from within the software. Next, the flow balance information that is embedded in the software is obtained at 52. After the geometry of the profile has been determined, the operating conditions have been determined, the width and thickness of each section of the profile have been specified, and the die swell/drawdown and flow balance information has been obtained, then the die dimensions for each section are determined at 54. If there is more than one die plate being used in the extrusion process, then the above steps can be repeated to obtain dimensions for each of the additional die plates in the process.

While determining the die dimensions for each section there are four unknowns, the die thickness, $t_{die}$, the die width, $w_{die}$, die velocity, $V_{die}$, and shear rate, S. These four unknowns are solved using equation 2 for the die velocity, equation 3 for shear rate, and the die swell/drawdown charts shown in FIGS. 3 and 4 that are represented by equations 4 and 5. Equations 3, 4, and 5 are as follows:

$$S = \frac{6V_{die}}{t_{die}}, \qquad (3)$$

$$t_{fac} = f(E, S) \Rightarrow t_{die}, \qquad (4)$$

$$w_{fac} = \frac{St_{die}}{6Et_{fac}} \Rightarrow w_{die}, \qquad (5)$$

wherein $t_{fac}$ is the thickness factor and $w_{fac}$ is the width factor.

Equations 1–5 are integrated with the die design charts of FIGS. 3 and 4 by developing a higher order polynomial curve fit for each draw speed in terms of shear rate. This enables equations 2, 3, and 4 to be solved simultaneously, while equation 5 is solved sequentially because of its derivative nature. The resulting equation for die thickness becomes highly non-linear. The solution procedure for a non-linear problem is a challenge because of the possibility of multiple solutions. In the present invention, the solution for the die dimension closest to the profile dimension is selected as the first choice. The non-linear solver is the bi-section method, which is relatively efficient for this particular problem. This approach provides a natural way to introduce the polymer resin into the calibrator without any squeezing and stretching near the entrance region.

If the calculated die width for certain sections of the profile needs modifications due to the die and mandrel construction and assembly, the following mass balance equation is used to update the profile thickness:

$$t'_{prof} = t_{prof}\left(\frac{w_{die}}{w'_{die}}\right), \text{ wherein} \qquad (6)$$

$t'_{prof}$ is the new profile thickness and $w'_{die}$ is the new die width which is determined manually based on the die construction constraints.

In another embodiment, if the die swell/drawdown information is not available, then a simplified approach can be devised based on the flow and mass balance only. The die width can then be approximated as the profile width. The die velocity for each section of the profile is still calculated by equation 2. Using the mass balance concept, the die thickness is defined as:

$$t_{die} = t_{prof}\left(\frac{E}{V_{die}}\right) \qquad (7)$$

Substituting equation 2 into equation 7 and solving for the die thickness results in the following equation:

$$t_{die} = \sqrt[\frac{2n+1}{n}]{\frac{Et_{prof}2(2n+1)(2L_{die}K)^{1/n}}{n\Delta P^{1/n}}} \quad (8)$$

This type of tooling iteration is generally achieved by studying the flow patterns at the die exit, where the thinner sections of the die that flow at a lower speed are stretched by the constant draw speed of the puller to produce thinner profile sections. This simplified approach does not provide the natural fit between the swelled resin free surfaces and the calibrator surfaces, possibly resulting in some degree of squeezing and stretching of the extrudate between the die exit and the entrance of the calibrator.

Figure 8:
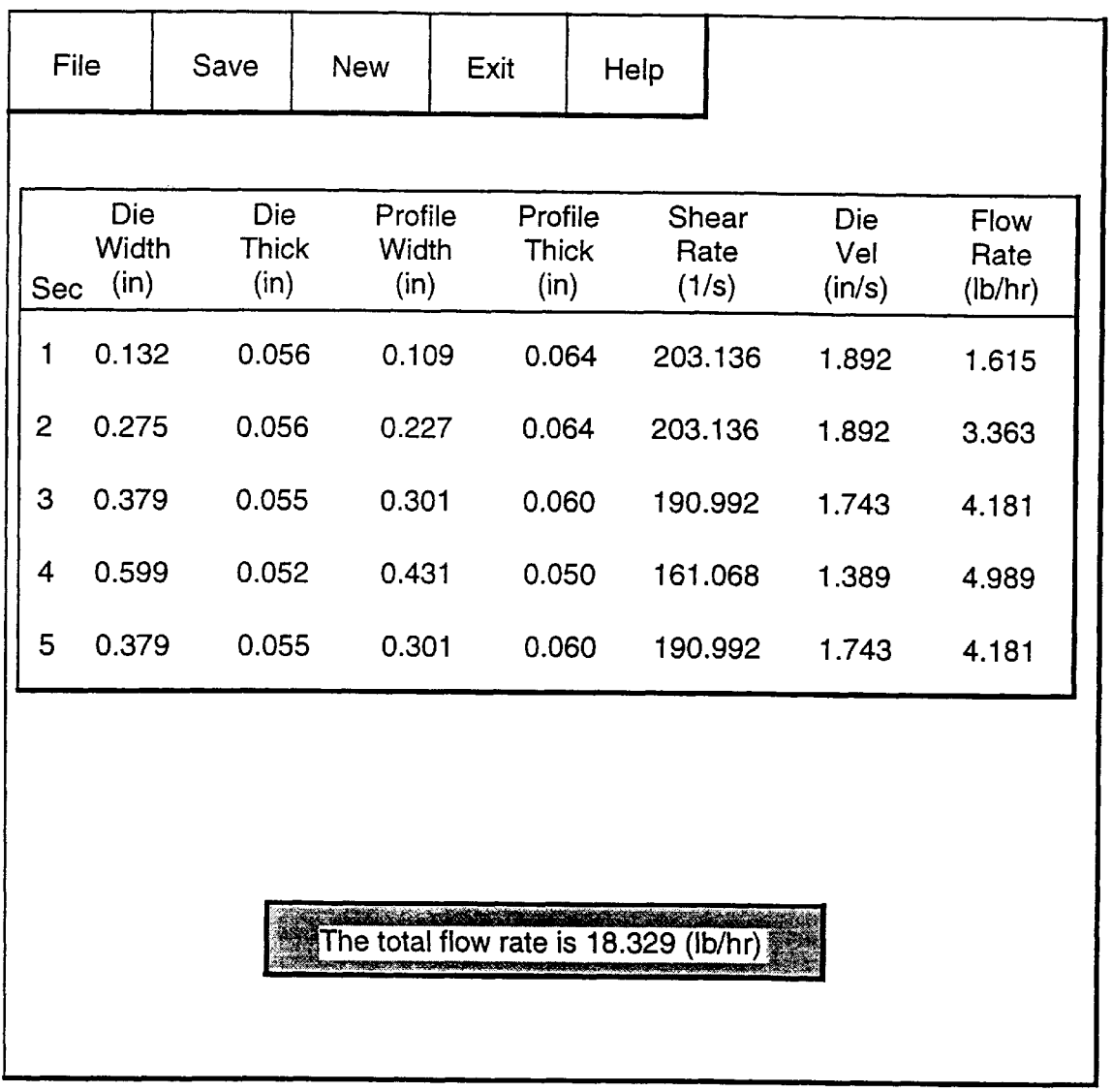
FIG. 8 shows an example of another screen view from a PC showing output displays of die dimensions.

As mentioned above, the present invention is implemented in a computer such as a PC. FIG. 6 shows an example of a screen view from a PC requesting that various operating information be inputted. The requested inputs are the number of sections in the profile, the draw speed, the die land length, and the pressure drop across the die plate. In the example shown in FIG. 6, the number of sections is 5, the draw speed is 10 ft/min, the die land length is 1.5 inches, and the pressure drop across the die plate is 2500 psi. FIG. 7 shows an example of another screen view from a PC requesting that the width and thickness of each section of the profile be inputted. The width and thickness values for each section of the profile are inputted and shown in FIG. 7. FIG. 8 shows an example of another screen view from a PC showing the output displays of the present invention. In particular, FIG. 8 shows the die width and die thickness that will shape a particular polymer resin material into a profile having a particular width and thickness and shear rate for each section at a particular die velocity and flow rate. In addition, the total flow rate for obtaining the profile is displayed. In the example shown in FIG. 8, the total flow rate is 18.329 lb/hr. The implementation of the present invention in a PC enables a designer to readily develop a die design for shaping a polymer resin into a profile at a computer without having to endure cut and trial iterations.

It is therefore apparent that there has been provided in accordance with the present invention, a method for designing a profile extrusion die that fully satisfies the aims and advantages and objectives hereinbefore set forth. The invention has been described with reference to several embodiments, however, it will be appreciated that variations and modifications can be effected by a person of ordinary skill in the art without departing from the scope of the invention.

We claim:

1. A method for designing an extrusion die for shaping a polymer resin material into a profile having a plurality of sections, the method comprising the steps of:

determining a plurality of operating conditions for shaping the resin material into the profile, wherein the plurality of operating conditions include draw speed, die land length, and pressure drop across the die plate;

specifying the profile dimensions of each of the plurality of sections, the profile dimensions including width and thickness;

providing extrusion information for the polymer resin, the extrusion information including die swell/drawdown and flow balance; and determining die dimensions for shaping the resin material into the profile in accordance with the determined operating conditions, the specified profile dimensions, and the provided extrusion information.

2. The method according to claim 1, wherein the die dimensions are determined by coupling the die swell/drawdown and flow balance with the operating conditions and profile dimensions.

3. The method according to claim 1, wherein the die swell/drawdown extrusion information comprises representations illustrating relationships between die swell/drawdown of the resin material, the representations arranged into die design charts for die opening thickness and die opening width, the design chart for die opening thickness containing representations of shear rate, draw speed, and a thickness factor, the design chart for die opening width containing representations of shear rate, draw speed, and a width factor.

4. A computer-implemented method for designing an extrusion die for shaping a polymer resin material into a profile having a plurality of sections, the method comprising the steps of:

obtaining a plurality of operating conditions for shaping the resin material into the profile, wherein the plurality of operating conditions include draw speed, die land length, and pressure drop across the die plate;

specifying the profile dimensions of each of the plurality of sections, the profile dimensions including width and thickness;

providing extrusion information for the polymer resin, the extrusion information including die swell/drawdown and flow balance; and determining die dimensions for shaping the resin material into the profile in accordance with the obtained operating conditions, the specified profile dimensions, and the provided extrusion information.

5. The computer-implemented method according to claim 4, wherein the die dimensions are determined by coupling the die swell/drawdown and flow balance with the operating conditions and profile dimensions.

6. The computer-implemented method according to claim 4, wherein the die swell/drawdown extrusion information comprises representations illustrating relationships between die swell/drawdown of the resin, the representations arranged into die design charts for die opening thickness and die opening width, the design chart for die opening thickness containing representations of shear rate, draw speed, and a thickness factor, the design chart for die opening width containing representations of shear rate, draw speed, and a width factor.

7. An article of manufacture, comprising:

a computer usable medium containing computer readable program code means embodied therein for designing an extrusion die for shaping a polymer resin material into a profile having a plurality of sections, the computer readable program code means in said article of manufacture comprising:

first computer readable program code means for obtaining a plurality of operating conditions for shaping the resin material into the profile, wherein the plurality of operating conditions include draw speed, die land length, and pressure drop across the die plate;

second computer readable program code means for specifying the profile dimensions of each of the plurality of sections, the profile dimensions including width and thickness;

third computer readable program code means for providing extrusion information for the polymer resin, the extrusion information including die swell/drawdown and flow balance; and fourth computer readable program code means for determining die dimensions for shaping the resin material into the profile in accordance with the obtained operating conditions, the specified profile dimensions, and the provided extrusion information.

8. The article of manufacture according to claim 7, wherein the die dimensions in the fourth computer readable program code means are determined by coupling the die swell/drawdown and flow balance with the operating conditions and profile dimensions.

9. The article of manufacture according to claim 7, wherein the die swell/drawdown extrusion information in the third computer readable program code means comprises representations illustrating relationships between die swell/drawdown of the resin, the representations arranged into die design charts for die opening thickness and die opening width, the design chart for die opening thickness containing representations of shear rate, draw speed, and a thickness factor, the design chart for die opening width containing representations of shear rate, draw speed, and a width factor.

* * * * *